United States Patent
Langels et al.

(12)

(10) Patent No.: US 6,473,656 B1
(45) Date of Patent: Oct. 29, 2002

(54) PROCESS AUTOMATION SYSTEM

(75) Inventors: Hans-Joachim Langels, Langquaid; Michael Brotz, Ettlingen; Raimund Klein, Oberursel, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,576
(22) PCT Filed: Jun. 20, 1997
(86) PCT No.: PCT/DE97/01282
  § 371 (c)(1),
  (2), (4) Date: Sep. 16, 1999
(87) PCT Pub. No.: WO97/50025
  PCT Pub. Date: Dec. 31, 1997

(30) Foreign Application Priority Data

Jun. 21, 1996 (DE) .......................... 196 24 929

(51) Int. Cl.[7] .................. G05B 19/418; G05B 13/02
(52) U.S. Cl. ............... 700/17; 700/7; 700/19; 700/28
(58) Field of Search ............... 700/9, 17, 20, 700/83, 2, 7, 18, 28; 709/213, 220, 221, 222

(56) References Cited

U.S. PATENT DOCUMENTS

| | | | |
|---|---|---|---|
| 4,819,149 A | * 4/1989 | Sanik et al. | 364/132 |
| 4,935,863 A | 6/1990 | Calvas et al. | |
| 5,068,778 A | 11/1991 | Kosem et al. | |
| 5,452,201 A | 9/1995 | Pieronek et al. | |
| 5,768,119 A | * 6/1998 | Havekost et al. | 364/133 |
| 6,088,665 A | 7/2000 | Burns et al. | 702/188 |
| 6,332,180 B1 | * 12/2001 | Kauffman et al. | 711/153 |

FOREIGN PATENT DOCUMENTS

| | | |
|---|---|---|
| DE | 42 35 186 | 4/1994 |
| EP | 0 201 063 | 11/1986 |
| EP | 0 303 565 | 2/1989 |
| EP | 0 352 683 | 1/1990 |
| EP | 0 413 044 | 2/1991 |
| EP | 0 604 091 | 6/1994 |
| JP | 62-307552 | 12/1987 |
| JP | 4-195201 | 7/1992 |
| WO | 95/30937 | 11/1995 |

OTHER PUBLICATIONS

Jens Thielmann, "Dezentral bringt mehr", Drive & Control 1/96, pp 4–9.
H. Walz, "Dezentrale Automatsierungssysteme auf PDV–Bus–Basis", Elektronik 8/19.4 1984, pp. 45–50.
W. Muller, "Aus den Unternehmen Procontrol 1, ein dezentrales Industrieleitsystem", Regelungstechnische Praxis, 26 Jg. 1984, H 11, pp. 513–517.
"Offene Kommunikation mit dem Aktuator–Sensor–Bereich", Engineering & Automation 17 (1995), Heft 1, pp. 10–11.

* cited by examiner

*Primary Examiner*—Paul P. Gordon
(74) *Attorney, Agent, or Firm*—Staas & Halsey LLP

(57) ABSTRACT

Local technology modules automatically execute given functions as part of process automation. Each technology module has a memory storing module-specific information about the respective function of the technology module and its tie-in to a measuring point, open- and closed-loop control system. During an initialization phase, this information is transmitted to a central communication device, where it is stored for access by an operator communication and monitoring device. It can thus automatically add the information to its operator communication and monitoring interface.

11 Claims, 2 Drawing Sheets

PROCESS AUTOMATION SYSTEM

BACKGROUND INFORMATION

Conventional process automation systems have a hierarchical structure from a top operator communication and monitoring level, also called the management or command level, to a bottom sensor/actuator level with automation levels in between. Automation modules in the individual automation levels communicate over bus systems, but a high degree of traditional connecting structures can still be found especially on the bottom automation level, resulting in high cable installation costs at the time of installation of the systems. Therefore, bus systems are also being used to an increasing extent for coupling the sensors and actuators (Siemens, Engineering & Automation, 1/95, pages 10, 11).

Programming and start-up of automation modules and equipment in the operator communication and monitoring level may be accomplished in various ways.

In the simplest case, the automation modules are programmed first individually. The operator communication and monitoring level is then programmed separately, and next the communication between automation modules and the operator communication and monitoring level is programmed. However, this programming is time-consuming and is subject to errors.

If all the information about the process automation system is present in the operator communication and monitoring level, which is usually the case only if the automation system is homogeneous and has been constructed by one party, then both the automation modules and the operator communication and monitoring level and the communication can be programmed and started up from a central location using an engineering tool (top-down procedure). However, this procedure is impossible if the automation system is subsequently modified or expanded, if external automation systems are tied in, or if the operator communication and monitoring level is retrofitted.

Finally, the automation modules can be programmed with one tool and then the programming data transferred to a tool for programming the operator communication and monitoring level. This procedure presupposes the existence of a program file for the automation modules.

SUMMARY OF THE INVENTION

An object of the present invention is to create a process automation system that can be installed without any major programming and start up expense and can be modified or expanded subsequently.

In accordance With the present invention, the functions that can be executed automatically by the individual technology modules include, for example, a controller, a setpoint generator, a sensor (actual value detector) and an actuator (final controlling element). The module-specific information first includes the respective function of the technology module, i.e., a controller, for example, and its tie-in to the measuring and control system, i.e., the addresses of other technology modules, namely here the addresses of the setpoint generator and actual value sensor from which the controller receives its input values, and the address of the final controlling element to be influenced by the controller. In addition, the module-specific information includes information on the respective type of device, manufacturer, etc. The stored, module-specific information is transmitted over a data bus from the communication unit of the respective technology module to the communication device, where it is stored for rapid access by the operator communication and monitoring device. The operator communication and monitoring device can thus access the information from all the technology modules connected to the data bus and automatically add this information to its operator communication and monitoring interface or create the operator communication and monitoring interface with appropriate means on the basis of the module-specific information. Thus, the automation systems according to the present invention can be created, modified or expanded very easily from the process environment.

In addition to the module-specific information transmitted automatically from the technology modules to the communication device and stored there, additional system-specific information can be entered into the communication device via a service interface and stored there in an advantageous manner. One example of this would be partitioning information in a building automation system, which information is used to create the operator communication and monitoring interface.

The technology modules may exchange function-relevant information with each other, preferably via their communication units and the data bus. Thus, the above-mentioned controller may receive the setpoint from the setpoint generator and the actual value from the actual value sensor over this pathway and may in turn issue a control command to the final controlling element.

As an alternative or additionally, the technology modules may have input and/or output connections which are interconnected by conductors for direct transmission of said function-relevant data and quantities.

The operator communication and monitoring device may be connected to the communication device by a long-distance bus, which may also include a telephone network or a wireless data transmission path. It is thus easily possible to operate and observe the automation system or several similar automation systems at different sites from a central location. One example of this is building automation with a central operator communication and monitoring device and different automation systems for different buildings.

BRIEF DESCRIPTION OF THE DRAWINGS

To further explain the present invention, reference is made below to the drawings in the figures, which show.

DETAILED DESCRIPTION

Figure 1:
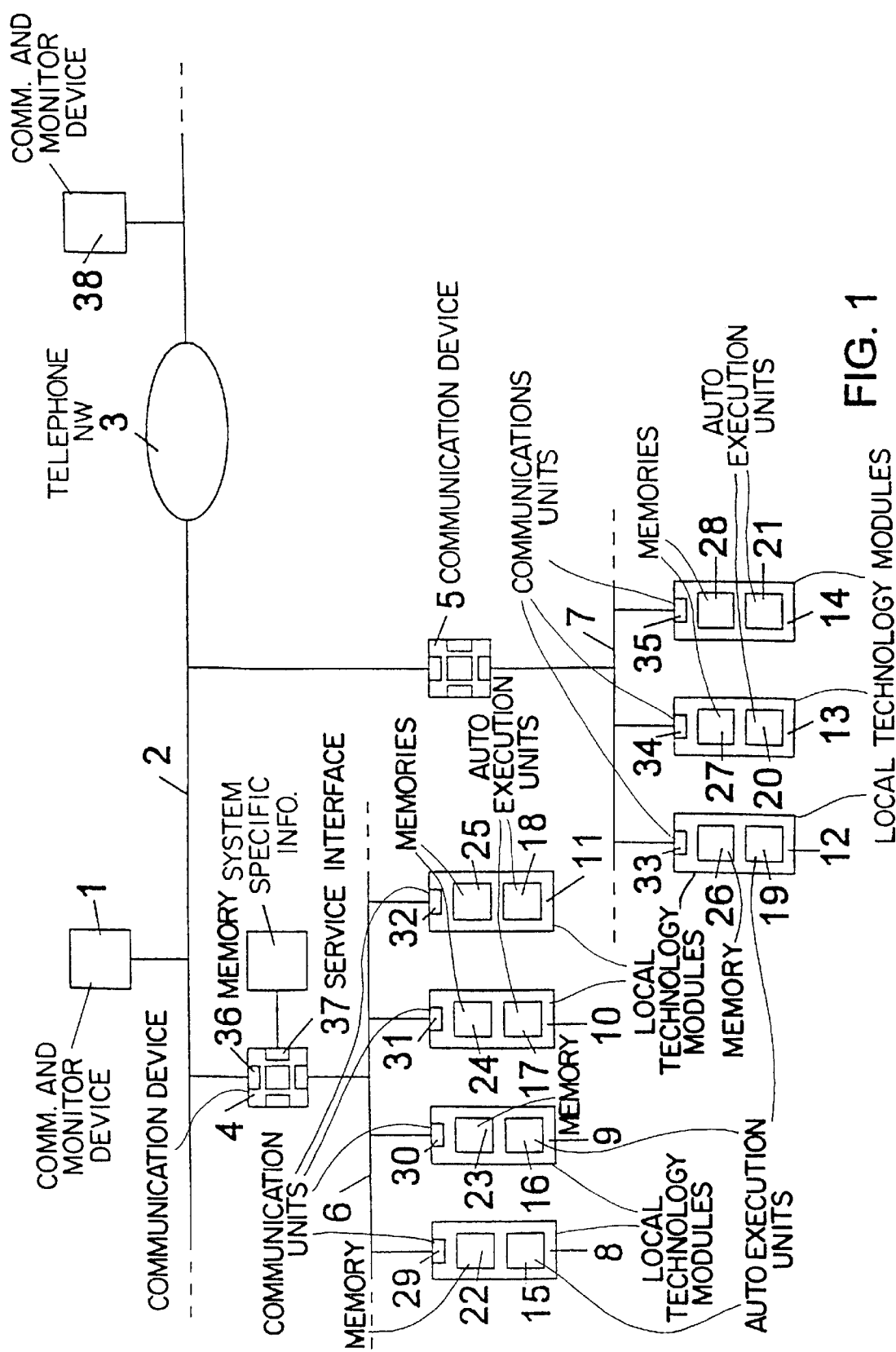
FIG. 1 shows an example of the automation system according to the present invention in the form of a block diagram.

FIG. 1 shows a process automation system with an operator communication and monitoring device 1 which can access, with proper authorization, each communication device 4, 5 (network interface controller) connected to long-distance bus 2, here in general a data transmission system, e.g., with telephone network 3. Local technology modules 8 through 14 are connected to each communication device 4, 5 over a data bus 6, 7.

Each technology module 8 through 14 has means 15 through 21 for automatic execution of a given function; in the case of technology modules 8, 9, 10 and 11 shown here, these are the functions of the controller, setpoint generator, final controlling element and actual value sensor.

Furthermore, each technology module 8 through 14 has a memory 22 through 28 where module-specific information, such as the respective function of technology modules 8 through 14 and their tie-in to the measuring and control system, i.e., their interaction with other technology modules, is stored. In the case of controller 8, this would be the "controller" information plus the addresses of setpoint generator 9 and actual value sensor 11, from which controller 8 obtains its setpoints and actual values, and the address of final controlling element 10, which is controlled by controller 8 as a function of the system deviation. Actual value sensor 11 contains the "actual value sensor" information plus the address of controller 8 to which it supplies the actual value. Additional stored module-specific information includes the given type of device, the manufacturer, the release, and the like.

All technology modules 8 through 14 also have communication units 29 through 35 by which they are connected to the associated data bus 6, 7.

During an initialization phase, individual technology modules 8 through 11, for example, log onto higher-level communication device 4 by having their communication units 29 through 32 transmit module-specific information from memories 22 through 25 over data bus 6 to communication device 4, where this information is deposited in a memory 36. Operator communication and monitoring device 1 can then access memory 36 of communication device 4 over long-distance bus 2 and add the module-specific information stored there to its operator communication and monitoring interface in automated form or create this interface on the basis of the access information. Module-specific information contained in memory 36 of communication device 4 can also be supplemented by system specific information which can be supplied to communication device 4 over a service interface 37.

During process control, individual technology modules 8 through 11 exchange function-relevant information over communication units 29 through 32 and data bus 5 in the example shown here. Thus, controller 8 receives the setpoint from setpoint generator 9 and the actual value from actual value sensor 11 and calculates from them a manipulated variable, which it sends to final controlling element 10.

Process data of subordinate technology modules, e.g., 8 through 11, is routed over communication device 4 to other communication devices 5 or to operator communication and monitoring device 1 to another operator communication and monitoring device 38 only after this routing request is received by this communication device. Routing between two communication devices 4, 5 is usually a process function which can be deposited permanently in the communication device. Routing to one of operator communication and monitoring devices 1, 38 is accomplished by selection by an operator. Temporary storage of instantaneous process data in communication device 4, 5 is possible theoretically but is not provided here because of the required storage space.

Figure 2:
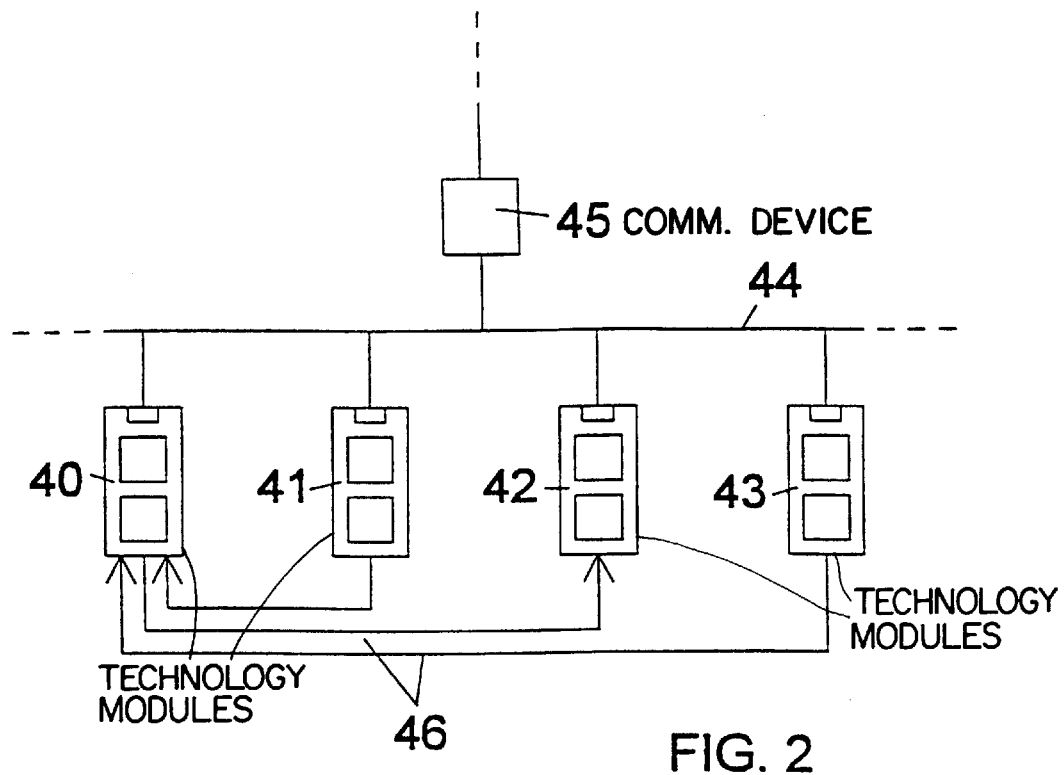
FIG. 2 shows an alternative embodiment of the part of the automation system around the technology module.

FIG. 2 shows the connection of technology modules 40 through 43 to a communication device 45 over a data bus 44. Function-relevant data and quantities transmitted between individual technology modules 8 through 11 over communication units 29 through 32 and data bus 6 in the case of the embodiment according to FIG. 1 are transmitted here between the participating technology modules 40 through 43 over separate line terminals 46.

Figure 3:
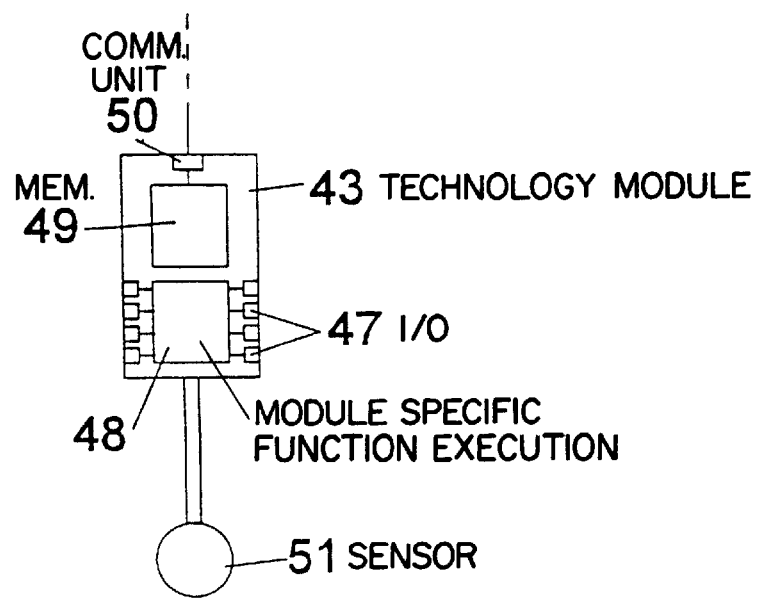
FIG. 3 shows a block diagram of a technology module.

As FIG. 3 shows, this technology module 43, for example, has a selected number of input and output terminals 47, each of which can be used separately as a binary or analog input or output. These input and output terminals 47 are allocated to means 48 for execution of the module-specific function. The memory containing the module-specific information is labeled as 49 and the communication unit as 50. The function of technology module 43 shown here is that of an actual value sensor, which is why technology module 43 is equipped with a sensor 51 and forms a structural unit with it. In addition, however, it is also possible to provide the sensor outside of technology module 43 and connect it to one of input terminals 47 by a line.

What is claimed is:

1. A process automation system for implementing a measuring and control system, comprising:
   an operator control and monitoring device coupled to a data bus via a communication device;
   local technology modules comprising arrangements for automatic execution of predefined functions, each respective one of the local technology modules comprising a memory storing module-specific information about i) a respective function of the respective one of the local technology modules, and ii) a tie-in of the respective function of the respective one of the local technology modules to the measuring and control system, each respective one of the local technology modules comprising a respective communication unit transmitting during an initialization phase the module-specific information for access by the operator control and monitoring device.

2. The process automation system according to claim 1, wherein the communication device comprises a service interface for input and storage of additional, system-specific information.

3. The process automation system according to claim 1, wherein the operator control and monitoring device comprises an arrangement for creating an operator control and monitoring interface from the module-specific information.

4. The process automation system according to claim 3, wherein the arrangement for creating the operator control and monitoring interface further creates the operator control and monitoring interface from additional, system-specific information stored in a service interface of the communication device.

5. The process automation system according to claim 1, wherein at least some of the local technology modules exchange function-relevant data over the data bus.

6. The process automation system according to claim 1, further comprising:
   an arrangement executing the respective function of at least some of the local technology modules comprising at least one of input and output terminal for exchanging at least one of function-relevant data and quantities over line terminals between the at least some of the local technology modules.

7. The process automation system according to claim 1, wherein the operator control and monitoring device is coupled to the communication device via a long-distance bus.

8. A process automation system for implementing a measuring and control system, comprising:
   an operator control and monitoring device coupled to a data bus; and
   local technology modules comprising arrangements for automatic execution of predefined functions, each respective one of the local technology modules including a memory storing module-specific information about i) a respective function of the respective one of the local technology modules, and ii) a tie-in of the respective function of the respective one of the local technology modules to the measuring and control system, each respective one of the local technology modules comprising a respective communication unit transmitting during an initialization phase the module-specific information for access by the operator control and monitoring device.

9. The process automation system according to claim 8, wherein the operator control and monitoring device comprises an arrangement for creating an operator control and monitoring interface from the module-specific information.

10. The process automation system according to claim 8, wherein at least some of the local technology modules exchange function-relevant data over the data bus.

11. The process automation system according to claim 8, further comprising:

an arrangement executing the respective function of at least some of the local technology modules comprising at least one of input and output terminal for exchanging at least one of function-relevant data and quantities over line terminals between the at least some of the local technology modules.

* * * * *